Figure 1:
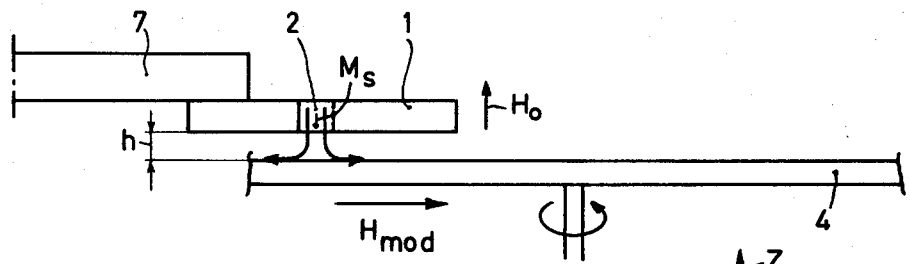

United States Patent [19]
de Jonge

[11] 3,935,594
[45] Jan. 27, 1976

[54] MAGNETIC BUBBLE READ/WRITE HEAD FOR A MAGNETIC RECORDER/PLAYBACK DEVICE

[75] Inventor: Frederik Ate de Jonge, Eindhoven, Netherlands

[73] Assignee: U.S. Philips Corporation, New York, N.Y.

[22] Filed: Apr. 29, 1974

[21] Appl. No.: 464,786

[30] Foreign Application Priority Data
Feb. 28, 1974 Netherlands .................... 7402694

[52] U.S. Cl. .................. 360/55; 360/77; 360/110
[51] Int. Cl.². G11B 5/02; G11B 21/02; G11B 5/12
[58] Field of Search ....... 340/174 TF; 360/110, 112, 360/111, 75, 77, 55

[56] References Cited
UNITED STATES PATENTS 3,793,639 2/1974 Enz et al. ............................ 360/55
3,793,640 2/1974 Potgiesser ........................... 360/55

Primary Examiner—Robert S. Tupper
Attorney, Agent, or Firm—Frank R. Trifari; Simon L. Cohen

[57] ABSTRACT

A device for recording and playing back information in a spiral-like track or a track consisting of concentric circles present on a disk-shaped recording medium, in which the storage and playback element consists of a sheet of magnetizable material which contains a single-wall magnetic domain. The polarity of a radially directed magnetic field can be inverted according to a frequency modulated with a signal to be recorded so as to record information together with the stray field of the domain. A detector is present to detect position variations of the domain upon playing back and means are present to correct the position of the domain in the sheet by way of fine control upon playing back.

11 Claims, 2 Drawing Figures

MAGNETIC BUBBLE READ/WRITE HEAD FOR A MAGNETIC RECORDER/PLAYBACK DEVICE

The invention relates to a device for storing and playing back information in a spiral-like track or a track consisting of concentric circles present on a disk-shaped recording medium.

It is known to record information on circular disks in a spiral-like track. The information may be stored optically utilizing photolithographic methods in the form of surface deformations (for example, recesses) of variable length and at a variable mutual spacing (Philips' Technisch Tijdschrift 33, pp. 186–188, 1973, No. 7). The recording is comparatively simple, but the playing back of the information on the disk surface, which must take place optically without a mechanical guide on the plate itself, presents considerable problems.

For example, for the required accurate focusing on the surface of the disk, of the light beam used during playing back, a rather complicated optical system is necessary. In addition, the light beam must remain centered on the track which has a pitch of only a few microns, in spite of a possible eccentricity and lack of concentricity of the track. A lack of concentricity of the track may stem from several causes. Deformation of the disk, eccentricity of the central hole in the disk and play of the shaft of the record player in said hole cause the disk and hence the track to rotate eccentrically.

An additional drawback is that the information stored in the surface of the disk cannot be erased.

It is an object of the present invention to provide a device of the above-mentioned type in which the stored information can both be played back and erased in a simple manner.

For that purpose, the device according to the invention is characterized in that it comprises a storage and playback element in the form of a sheet of magnetizable material having an easy axis of magnetization substantially normal to the plane of the sheet, which element is secured to an arm and is destined to cooperate with a disk-shaped recording medium of a magnetizable material, said sheet comprising a single-wall magnetic domain, a device being present for generating a magnetic field which is directed radially relative to the disk-shaped recording medium and has a strength which, together with the stray field of the magnetic domain emerging from the sheet is sufficient to overcome the coercive force of the magnetizable material of the recording medium, means for inverting the polarity of the magnetic field according to a frequency modulated with a signal to be recorded, a detector for detecting variations in the position of the domain caused by variations in the magnetization pattern of the recording medium, and means present on the sheet to correct the position of the domain in the sheet during playback.

The most important aspect of the device according to the invention resides in the fact that upon playing back the information, a fine control of the position of the domain itself is possible so that no fine adjustment of the arm which moves continuously towards the center of the disk and to which the playback element is secured is necessary. Moreover, the use of a magnetizable recording medium involves the possibility of erasing the information. The fine control of the position of the domain which can take place over a distance of a few microns may be used both to correct velocity variations (of the recording medium) and to center the domain on the track.

The invention will be described in greater detail, by way of example, with reference to the drawing. In the drawing FIG. 1 is a sectional view of a device according to the invention and FIG. 2 is a plan view of the storage and playback element used in the device according to the invention.

Figure 2:
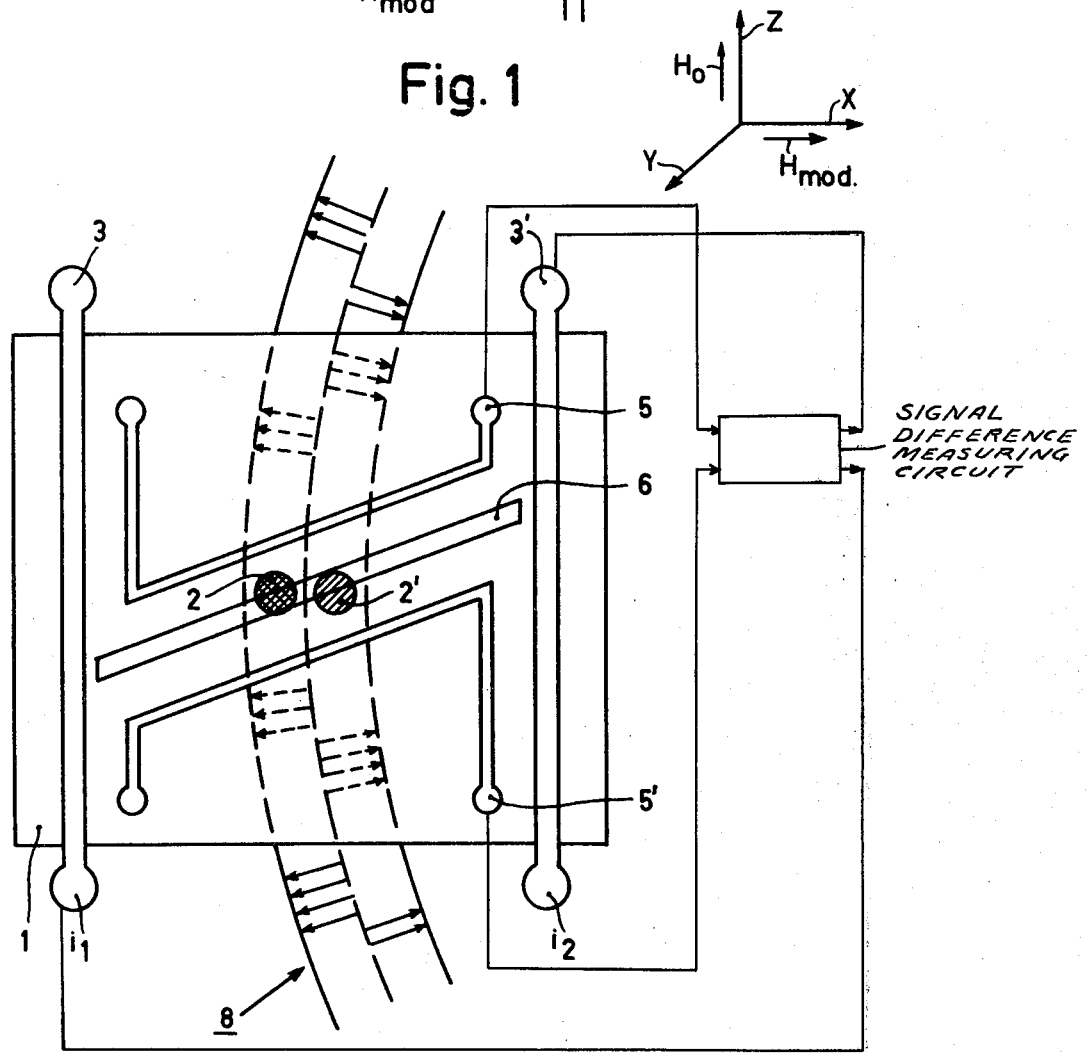

A sheet of magnetizable material 1 in which a single-wall magnetic domain 2 (so-called "bubble") has been generated in known manner is present in contact with or at a very small distance $h$ ($h$ = 0.5 to 1 $\mu$um) from a magnetic disk 4 in such a position that the $x$ direction indicated is directed towards the center of the disk 4 (FIG. 1). A bias field $H_o$ (in the +z direction) perpendicular to the sheet 1 has such a field strength that the bubble 2 in the sheet 1 is maintained. The position of the bubble is fixed by means of a groove 6 (FIG. 2), but this may also be a permalloy strip, and the presence of a minimum in the magnetic field perpendicular to the sheet. This minimum can be realized by conveying currents $i_1$ and $i_2$ through the current conductors 3 and 3'. Independent of $y$, the minimum field value is constant over, for example, a line $x = a$. The bubble 2 then is at the point of intersection of the groove with the line $x = a$. The position of the minimum in the magnetic field, so the value of $a$, can be varied by varying the adjustment of the currents $i_1$ and $i_2$. As a result of this the bubble 2 may be moved along the groove 6.

The component of the bubble stray field which lies in the plane of the disk 4 is used to record information. This component is not sufficiently large to overcome the coercive force of the magnetic material of the disk. Therefore an auxiliary field $H_{mod}$ is produced which is directed radially. By inverting the polarity of said field according to a frequency modulated with the signal to be recorded, it is achieved that alternately part of the bubble stray field which is present at the side of the center of the disk and part of the field which is present at the circumference of the disk "records." In this manner a track 8 is recorded as is shown in FIG. 2. While the bubble 2 records, the sheet 1 is continuously moved towards the center of the disk 4 by the arm 7. In this manner a spiral is recorded. As already noted, the place of the groove 6 where the bubble 2 is present is determined by the ratio of the currents $i_1$ and $i_2$. The extent to which the bubble 2 is fixed to a specific place is determined by the absolute values of the currents $i_1$ and $i_2$. Upon recording, the bubble 2 is fixed in one fixed place. For playing back, however, the absolute values of $i_1$ and $i_2$ are adjusted so that the bubble position can easily be varied for correction purposes. Furthermore, upon playing back, the auxiliary field $H_{mod}$ is removed.

Upon playing back, the bubble 2 is moved alternately in the +x direction and the −x direction under the influence of the magnetization pattern of the track 8. This is indicated by 2 and 2'. The variation of the bubble position is detected by means of two detectors 5 and 5' which may be of magnetoresistance material. When the bubble follows the track 8 exactly, the signal out of detectors 5 and 5' for a bubble deviation in the +x direction is as large as that for a deviation in the −x direction. If this is not the case, the average position of the bubble is not centered on the track 8, and the position of the bubble in the sheet can be varied by variation of the ratio of the currents $i_1$ and $i_2$ until both detector signals are equally large. Velocity variations of the disk can be corrected in a corresponding manner with a location of the groove 6 in the direction of the relative direction of movement of the disk 4 by causing the bubble 2 to move "forward" or "backward".

Because bubbles can be made very small it is possible to realize a large information density on the disk. For example, a bit size of 3 μm in the radial direction and 1 μm in the tangential direction can be realized with a bubble which has a diameter of 1 μm. The distance h between the sheet 1 and the disk 4 should then be approximately 0.5 μm. Since a comparatively large amount of flux emerges from bubbles having a diameter of approximately 1 m, it is possible, for example, to record information on CoP layers by means of the storage element described.

What is claimed is:

1. A device for storing and playing back information in a spiral track on a disk recording medium having a magnetizable material, comprising a storage and playback element in the form of a sheet of magnetizable material having an easy axis of magnetization substantially normal to the plane of said sheet, an arm means secured to said element for radially moving said sheet with respect to said disk recording medium, said sheet having a single-wall magnetic domain, magnetic field generating means for providing a magnetic field directed radially relative to said disk recording medium and having a strength which, together with the stray field of the magnetic domain emerging from said sheet is sufficient to overcome the coercive force of said magnetizable material of said recording medium, means guiding said magnetic domain for movement on said sheet, means for inverting polarity of the magnetic field from said magnetic field generating means according to a frequency modulated with an information signal to be recorded, a detector means for detecting variations in the position of the domain caused by variations in the magnetization pattern recorded on said recording medium, and means to correct the position of said domain during playback in response to signals from said detector means.

2. A device as claimed in claim 1, wherein said guiding means allows said domain to move along a straight line which encloses an angle with the direction of relative movement of said recording medium with respect to said sheet so as to keep it centered on the track during playback.

3. A device as claimed in claim 2, wherein said guiding means includes a groove in the surface of said sheet and wherein said means for correcting the position of the domain includes two current conductors each extending at one end of said groove parallel to each other and at an angle with the axis of the groove and means for coupling the detector to the conductors.

4. A device as claimed in claim 3, wherein said detector means includes two mutually parallel detection elements along the long sides of said groove spaced at equal distances therefrom.

5. A device as claimed in claim 4, wherein said detection elements are of a magneto-resistance material.

6. A device as claimed in claim 4, wherein said means for correcting includes means for adjusting currents through said conductors responsive to a comparison of the signals of said two detection elements.

7. A device as claimed in claim 1, wherein said guiding means allows said domain to move along a straight line which coincides with the direction of relative movement of said recording medium with respect to said sheet so as to correct velocity variations during playback.

8. A device as claimed in claim 7, wherein said guiding means includes a groove in the surface of said sheet and wherein said means for correcting the position of the domain includes two current conductors each extending at one end of said groove parallel to each other and at an angle with the axis of the groove and means for coupling the detector to the conductors.

9. A device as claimed in claim 8, wherein said detector means includes two mutually parallel detection elements along the long sides of said groove spaced at equal distances therefrom.

10. A device as claimed in claim 9, wherein said detection elements are of a magneto-resistance material.

11. A device as claimed in claim 9, wherein said means for correcting includes means for adjusting currents through said conductors responsive to a comparison of the signals of the two detection elements.

* * * * *